United States Patent [19]

DiPietro

[11] Patent Number: 5,055,869
[45] Date of Patent: Oct. 8, 1991

[54] FILM SUPPLY MAGAZINE
[75] Inventor: Matthew DiPietro, Webster, N.Y.
[73] Assignee: Eastman Kodak Company, Rochester, N.Y.
[21] Appl. No.: 558,263
[22] Filed: Jul. 25, 1990
[51] Int. Cl.⁵ .............................................. G03B 17/26
[52] U.S. Cl. ................................... 354/276; 354/277; 206/455; 378/173
[58] Field of Search ....................... 354/276, 277, 284; 206/455; 378/173; 242/71.1

[56] References Cited

U.S. PATENT DOCUMENTS

| | | | |
|---|---|---|---|
| 3,790,160 | 2/1974 | Schmidt | 271/18 R |
| 3,912,932 | 10/1975 | Matsumoto et al. | 250/468 |
| 3,934,150 | 1/1976 | Matsumoto et al. | 250/468 |
| 3,934,735 | 1/1976 | Schmidt | 214/6 D |
| 4,135,800 | 1/1979 | Weidanz et al. | 354/174 |
| 4,158,409 | 6/1979 | Duinker | 206/455 |
| 4,201,919 | 5/1980 | Schmidt | 250/468 |
| 4,303,160 | 12/1981 | Weindanz et al. | 206/455 |
| 4,531,878 | 7/1985 | Tamura | 414/412 |
| 4,537,307 | 8/1985 | Tamura | 206/455 |
| 4,555,213 | 11/1985 | Tamura et al. | 354/276 |
| 4,571,140 | 2/1986 | Yamada et al. | 414/412 |
| 4,727,391 | 2/1988 | Tajima et al. | 354/277 |
| 4,738,366 | 4/1988 | Schmidt et al. | 206/630 |
| 4,783,019 | 11/1988 | Schmidt et al. | 242/74 |
| 4,809,313 | 2/1989 | Gandolfo | 378/182 |
| 4,853,724 | 8/1989 | Tajima et al. | 354/277 |
| 4,860,042 | 8/1989 | Tajima et al. | 354/277 |
| 4,876,706 | 10/1989 | Tajima | 378/174 |

Primary Examiner—Donald A. Griffin
Assistant Examiner—Le Nguyen
Attorney, Agent, or Firm—G. Herman Childress

[57] ABSTRACT

A supply magazine receives a package having a stack of film sheets within a light-tight bag. When the magazine is closed, the bag is driven from the magazine so that the sheets can be removed for exposure and development. The bag is removed at the rear end of the magazine and fed toward the front of the magazine so that it is accessible to the operator and to avoid having the bag fall into an associated printer/processor and out of the reach of the operator.

4 Claims, 3 Drawing Sheets

FILM SUPPLY MAGAZINE

CROSS-REFERENCE TO RELATED APPLICATION

Reference is made to commonly-assigned, copending U.S. patent application Ser. No. 558,271 entitled "Magazine for a Stack of Film Sheets", filed July 25, 1990 in the names of Michael Koelsch et al.

BACKGROUND OF THE INVENTION

The related application referenced above discloses a magazine for a stack of film sheets wherein the magazine is opened to receive a package containing a stack of film sheets, such as x-ray film sheets. The packaging material around the film sheets is positioned between a pair of gears so that when the magazine is closed the gears can be turned to drive the packaging material out of the rear end of the magazine. The magazine is used in apparatus capable of opening the magazine and individually removing sheets of film, or the magazine can be used in a darkroom where sheets of film are manually removed from the magazine.

Depending upon the construction of the apparatus that receives the magazine, feeding of the packaging material out the rear of the magazine may or may not be acceptable. More specifically, in some kinds of apparatus, the packaging material should not be fed from the rear end of the magazine because it could easily fall into the apparatus and out of the reach of the operator. This could adversely affect operation of the apparatus and require the apparatus to be shut down until the packaging material is removed.

SUMMARY OF THE INVENTION

Accordingly, it is an object of the invention to feed packaging material removed from film sheets in a magazine from the rear of the magazine but to direct the packaging material toward the front of the magazine where it can be easily recovered by the machine operator.

The present invention is directed to an improvement in a magazine that receives a package having a stack of film sheets enclosed within a light-tight, flexible bag. The magazine has a front end and a rear end, and it has upper and lower portions that are hinged together at the rear end of the magazine. Thus, the upper portion is swingable about the hinge between a closed position and in engagement with the lower portion to enclose a package within the magazine, and an open position wherein a package can be loaded into the magazine. The improvement comprises drive means adjacent the rear end of the magazine, engageable with a package in the magazine for removing the bag from the stack of sheets therein. The upper portion of the magazine has an elongate opening between the drive means and the rear end of the magazine through which the bag can be driven by the drive means. Means are provided for deflecting the bag toward the front of the magazine as it is driven through the opening.

BRIEF DESCRIPTION OF THE DRAWINGS

In the detailed description of the preferred embodiments of the invention presented below, reference is made to accompanying drawings, in which.

DETAILED DESCRIPTION OF THE INVENTION

In accordance with the present invention, a reusable, interchangeable film magazine is adapted to receive and hold a package containing a stack of film sheets enclosed within a light-tight flexible bag, and to remove the package material so that the sheets can be removed seriatim from the magazine and exposed, processed, etc. Before proceeding with a description of the magazine of the invention, a package suitable for use with the magazine will be described briefly.

Figure 6:
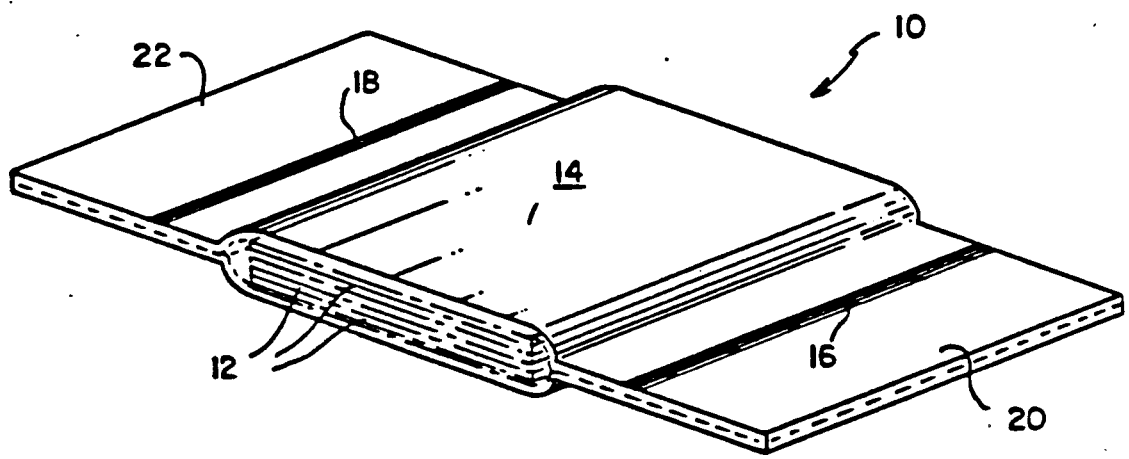
FIG. 6 is a perspective view of a film package suitable for loading into the magazines of the invention.

Referring now to FIG. 6 of the drawings, a package generally designated 10 comprises a stack of film sheets 12 enclosed within a light-tight, flexible bag 14. Film sheets 12 may comprise sheets of x-ray film, for example. Sheets 12 in a particular package 10 preferably are all the same size, however, similar film packages 10 can contain film sheets 12 of various sizes. The bag 14 can be formed from a flexible barrier wrap material which is placed around the stack of film sheets 12. The material forming the bag is heat sealed as required to form a light-tight package around the film sheets 12. Lines of heat sealing are shown at 16 and 18 in FIG. 6, and additional lines of heat sealing may be required, depending upon the manner of forming the bag 14. The heat seal line 16 if formed in a head or leading end portion 20 of the bag while heat seal line 18 is in a tail or trailing end portion 22 of the bag. Preferably the bag is loaded under a vacuum so that the bag material clings tightly to the sheets 12.

Figure 1:
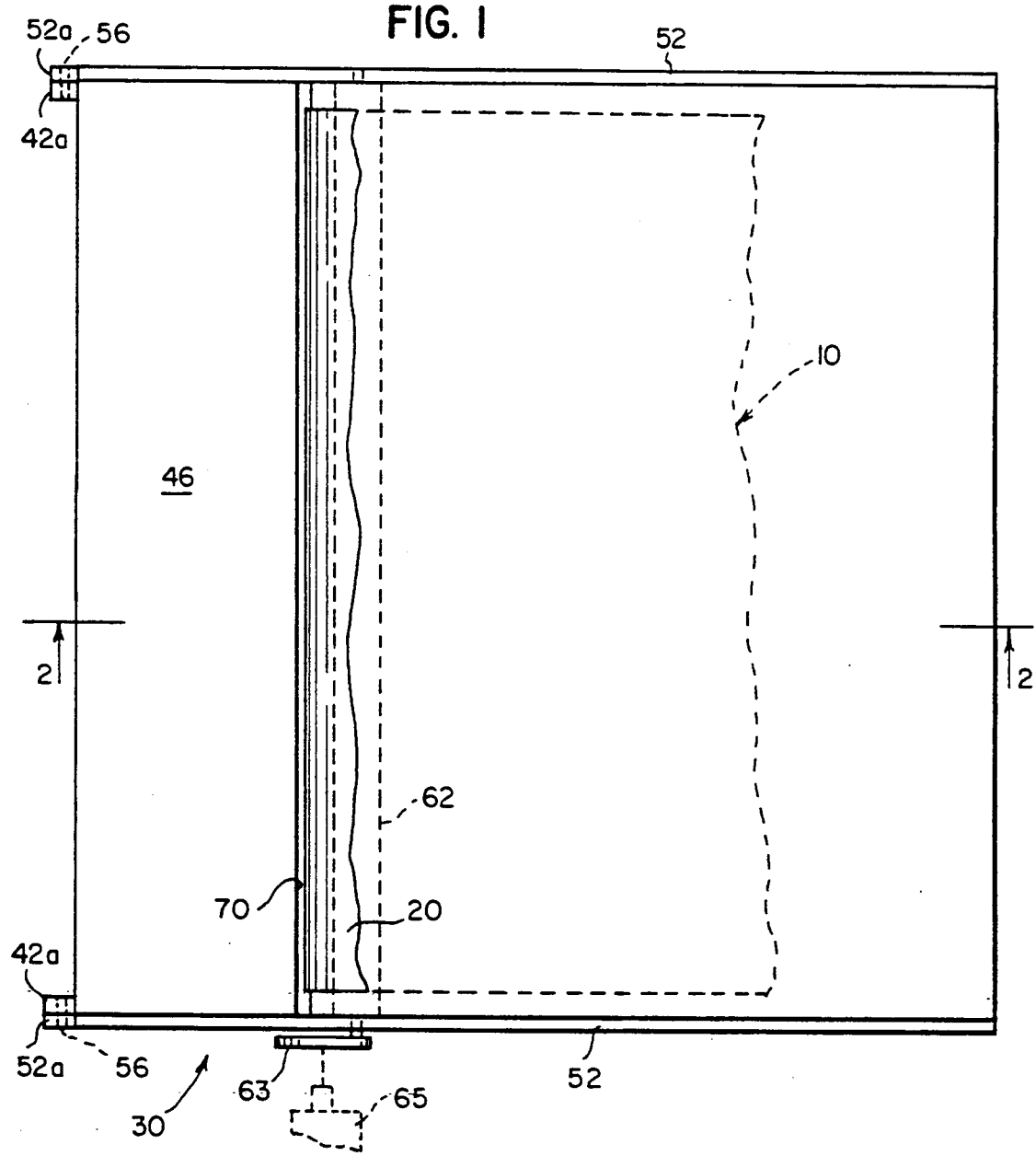
FIG. 1 is a plan view of one embodiment of the magazine of the present invention.
Figure 2:
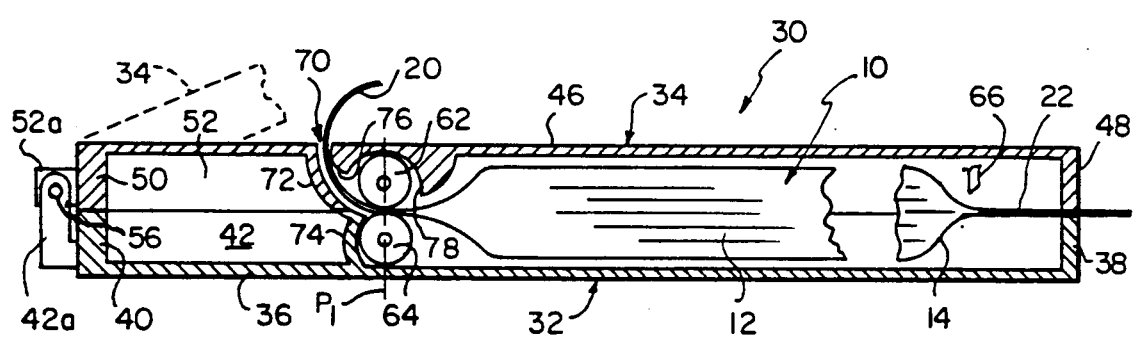
FIG. 2 is a transverse cross section taken along line 2—2 of FIG. 1.

Referring now to FIGS. 1 and 2, a magazine of the present invention is generally designated 30 and preferably comprises two portions 32,34 referred to herein as the lower portion and upper portion, respectively. The lower portion comprises a generally flat bottom 36 surrounded by a front wall 38, a rear wall 40 and two side walls, one of which is shown at 42 in FIG. 2. Walls 38, 40 and 42 project upwardly above the inner surface of bottom 36. Similarly, the upper portion 34 comprises a top or cover 46 which is surrounded by a front wall 48, a rear wall 50 and two side walls 52 which project downwardly from the top 46. The front walls, rear walls and side walls of the upper and lower portions contact corresponding walls of the other portion of the magazine and jointly define with the bottom and top a space within the magazine for receiving film package 10. Lightlocks (not shown) are provided along the facing edges of the walls of portions 32,34 so that the space within the magazine is light-tight when the upper portion is closed.

At the rear of the magazine side walls 52 each have an extension 52a that projects rearwardly, and side walls 42 each have an extension 42a that projects rearwardly and upwardly so that the two extensions are in side-by-side relationship as shown in FIG. 1. A pivot 56 extends through each of these pairs of extensions to pivotally connect the lower portion 32 to the upper portion 34. In this manner the upper portion 34 can be swung between a closed position shown in solid lines in FIG. 2 and an open position partially shown in dotted lines in FIG. 2 to enable the film package 10 to be inserted within the magazine. When the upper portion 34 is lowered to its closed position, the upper and lower portion can be latched together by suitable latch means (not shown).

A gear 62 is mounted in side walls 52 of the upper portion of the magazine and near the rear end thereof. A similar gear 64 is mounted on the side walls 42 of the lower portion 32 of the magazine. The axes of gears 62,64 are substantially parallel, and a plane through the axes is substantially perpendicular to a plane through the magazine in a front-to-rear direction. Gears 62,64 mesh when the upper portion of the magazine is in its closed position, and the gears are separated when the upper portion of the magazine is in its open position. This enables the leading end portion 20 of the film package 10 to be placed between the gears when the magazine is open, as explained in more detail later. When the gears are meshed, they form a lightlock which prevents light from entering the from portion of the magazine through the rear end thereof. Gears for removing a package from a magazine and for forming a lightlock are known from U.S. Pat. No. 4,571,140, for example. Gear 62 (or gear 64) can be driven by a crank handle 63, or by a motor 65. The motor for driving the gears may be in the apparatus that receives the magazine and coupled to a gear of the magazine by a drive train (not shown).

A cutter mechanism, schematically shown at 66 in FIG. 2, is provided at the front end of the magazine adjacent walls 38,48 for cutting the trailing end portion 22 of the package. The cutting mechanism is located to cut the package between the heat seal line 18 and the sheets 12 of film located within the package. Cutting mechanisms of various types are known for this purpose. The before-mentioned related U.S. patent application discloses a cutting mechanism in the walls 38,48 of the magazine.

A magazine constructed as described hereinbefore is substantially disclosed in the before-mentioned related U.S. patent application Ser. No. 558,277. The magazine of the related application drives the bag 14 out of the magazine between the rear walls 40,50 of the magazine. As pointed out hereinbefore, in some apparatus, such as a laser printer apparatus, it is possible for the bag thus removed from the magazine to fall into the apparatus and out of the reach of the user or operator. This is avoided by the present invention. More specifically, in accordance with the present invention cover 46 of the upper magazine portion 34 has an elongate continuous slot or opening 70 extending between walls 52. The slot is located rearwardly of gears 62,64 and between the gears and the rear walls 40,50 of the magazine.

A bag deflector 72 projects inwardly from cover 46 along one side edge of the slot. The deflector curves toward the front end of the magazine to a position near the nip between gears 62,64. A similar deflector 74 projects inwardly into the magazine from the bottom 36 of magazine portion 32 and is located relative to wall 72 so that when the magazine portions 32,34 are closed deflectors 72,74 abut and form a substantially continuous curved surface for deflecting and guiding the leading end portion 20 of the package out of the magazine and toward the front end of the magazine.

Similarly, a guide surface 76 extends inwardly from the other side of slot 70 toward the gears 62,64 and cooperates with the surface formed by deflector 72 to define the slot 70 and provide a smooth passageway for exit of the bag 14. The inner wall of cover 46 also has a curved, generally cylindrical surface 78 that closely surrounds gear 62 and helps prevent any light leaking into slot 70 from inadvertently exposing the film sheets 12 after the bag has been removed.

The magazine can be loaded under daylight conditions by lifting the upper portion 34 of the magazine about hinge 56 to thereby swing the upper portion to the position shown in dotted lines in FIG. 2. When the upper portion is raised, the package 10 is placed inside the magazine on the bottom wall 36 of the lower portion of the magazine. The trailing end portion 22 of the magazine is placed over the upper edge of wall 38 so that when the magazine is lowered it will be captured between the upper edge of wall 38 and the lower edge of wall 48. As mentioned earlier, a lightlock is provided between these walls. The leading end 20 of the package is placed over gear 64 and fed through slot 70. Then the upper portion 34 of the magazine is lowered to its solid line position in FIG. 2. Leading end portion 20 of the package can be grasped and pulled toward the front end of the magazine to the position shown in FIG. 2 as magazine position 34 is closed.

The trailing end portion 22 of the package is cut by mechanism 66. Then the bag 14 is removed from the sheets of film 12 either by rotating the handle 63 of the magazine or by inserting the magazine into a printer unit, for example, where a motor 65 can be coupled to gear 62 or gear 64 for rotating the gears in a direction to feed the bag out of the magazine and through the slot 70. In either case, as the bag is fed from the magazine, it is deflected toward the front end of the magazine due to the shape of walls 72 and 76 of the magazine. Thus, if the bag is stripped from the film while the magazine is in a printer unit or other apparatus, the bag is easily retrieved by the operator reaching on top of the magazine and pulling it away from the front of the magazine. This avoids the possibility that the bag, after removal, could fall into the unit and out of the reach of the user or operator.

Figure 3:
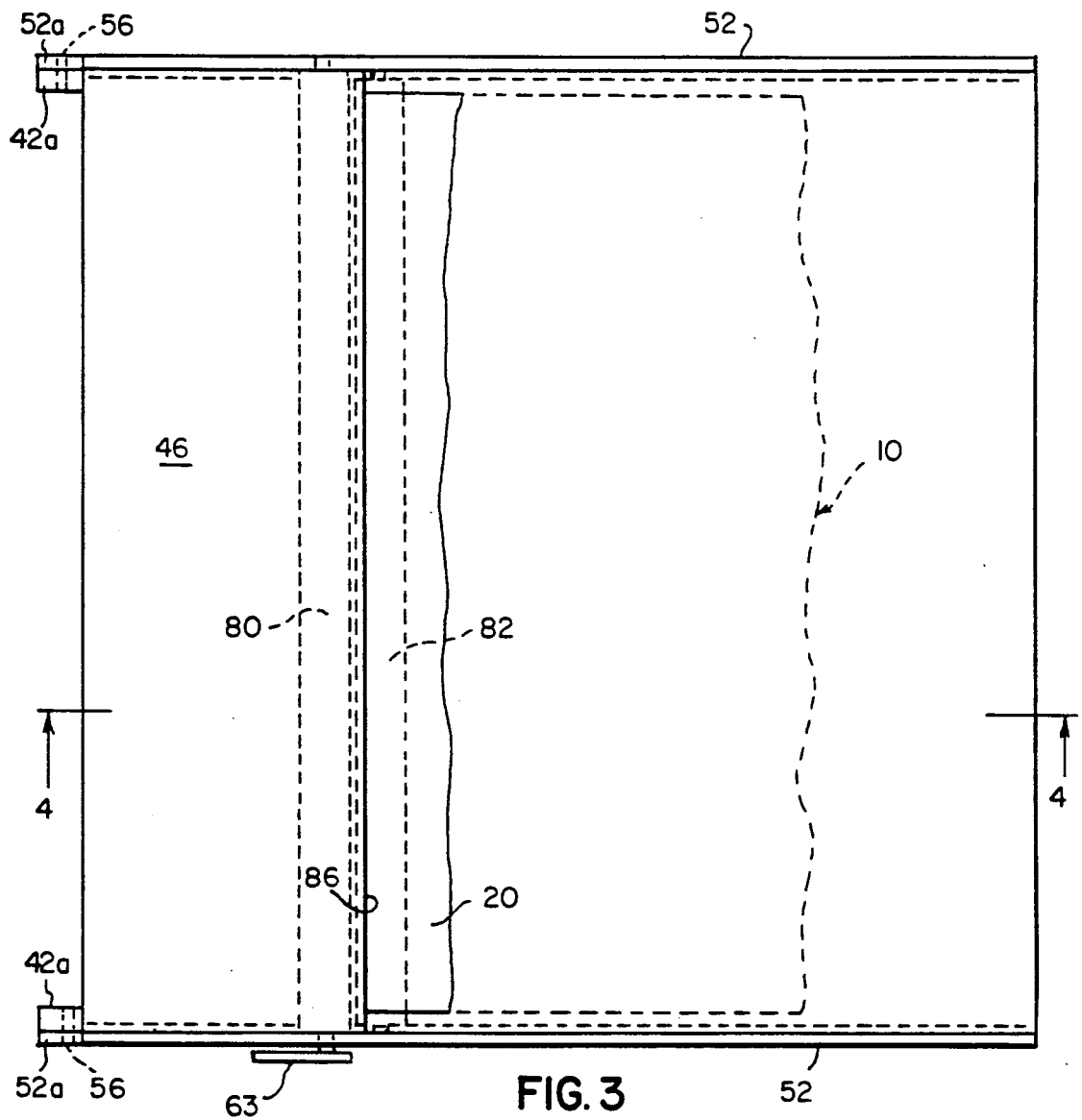
FIG. 3 is a plan view, similar to FIG. 1, showing another embodiment of a magazine of the present invention.
Figure 4:
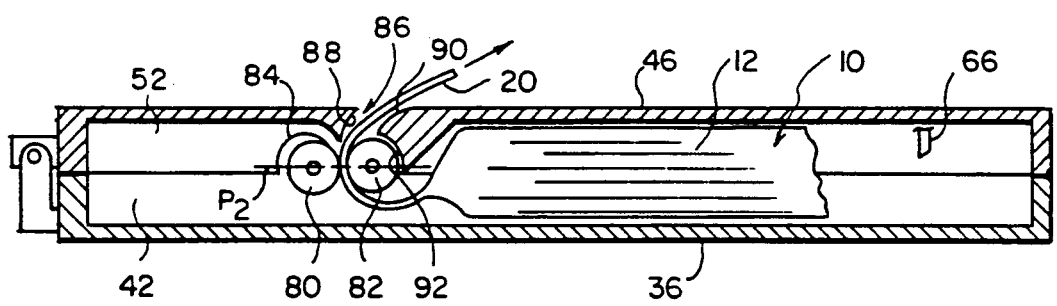
FIG. 4 is a transverse cross section taken along line 4—4 of FIG. 3.

The embodiment of the invention illustrated in FIGS. 3 and 4 is similar in many respects to the embodiment of FIGS. 1 and 2. Accordingly, the same reference numerals are used to designate the same or similar parts. In the embodiment shown in FIGS. 3 and 4, a pair of gears 80,82 used for driving the bag 14 out of the magazine are located in a side-by-side relationship within the magazine so that the axis of the gears are not only parallel to each other but also are located in a plane extending substantially through the magazine from its front to its rear (a right-to-left direction as viewed in FIG. 4). Gear 80 is mounted on a pair of generally circular raised ear portions 84 on the walls 42 of the lower magazine portion while gear 82 is mounted on walls 52 of the upper magazine portion.

The cover 46 has an elongate slot 86 located generally above the nip defined by rollers 80,82. Slot 86 is formed by a curved guide surface 88 and a second curved surface 90 in cover 46. Also, a portion of the cover projects downwardly below surface 90 and has a curved surface 92 that closely surrounds a portion of the outer surface of gear 82 to avoid leaking of light into the portion of the magazine containing the sheets of film 12.

In operation the magazine upper portion 34 is swung about pivots 56 to its open position and the package 10 is placed on the upper surface of magazine bottom 36. The leading end portion 20 of the bag of the package is placed adjacent gear 80 and threaded through slot 86. Then the upper portion 34 of the magazine is swung to its closed position so that the leading end portion 20 of the package is located outside the magazine and facing generally toward the front of the magazine. As the upper portion is lowered, the gears 80,82 mesh and capture therebetween the portion 20 of the package. The cutter mechanism 66 then cuts the trailing end portion 22 of the package. Gears 80,82 are rotated by a handle or motor (not shown) to pull the bag material from the film sheets 12 and drive it upwardly through slot 86 and toward the front of the magazine, i.e. to the right as viewed in FIGS. 3 and 4. This locates the bag in a position where it is easily accessible to the operator even after the magazine is inserted into a printer unit before the bag is removed.

Figure 5:
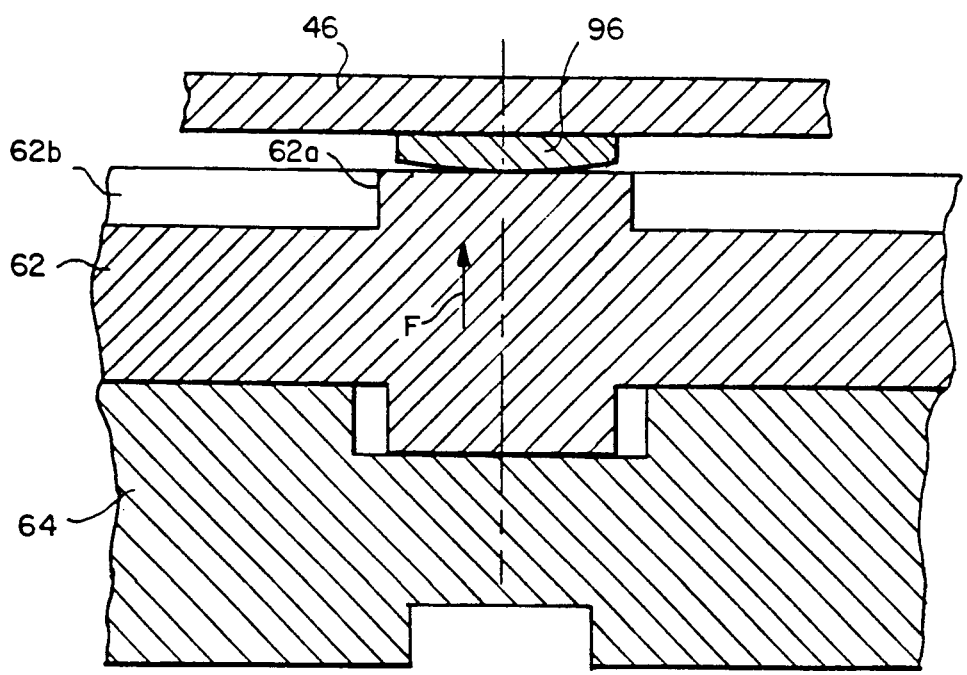
FIG. 5 is a fragmentary enlarged section illustrating apparatus for maintaining the central portion of the gears in engagement when under load.

Gears 62, 64, 80 and 82 need to be relatively long and have a small diameter in order to fit within the magazines of the invention. Gears of this shape have a tendency to flex when loade or driven. More specifically, the gears have a tendency to bow so that the center portions of the gears may become separated slightly, thereby reducing the driving force produced by the gears upon rotation. This can be avoided by providing a backup stop 96, FIG. 5, on cover 46 of the magazine directly above the center portion of gear 62. Gear 62 has a central portion 62a that is free of gear teeth 62b and which is adapted to engage the stop 96. Thus when the gears are loaded and the central portion of the gears tend to bow, a force F produced by this bowing tendency is exerted upwardly to urge the portion 62a of the gear against stop 96 to limit or prevent the gear from bowing significantly, i.e. not sufficient to adversely affect engagement between the gears 62 and 64. A similar backup or stop member (not shown) can be provided for gear 64 on the wall 36 of the magazine, if desired.

The invention has been described in detail with particular reference to preferred embodiments thereof, but it will be understood that variations and modifications can be effected within the spirit and scope of the invention.

I claim:

1. In a magazine for receiving a package having a stack of film sheets enclosed within a light-tight, flexible bag, the magazine having a front end and a rear end, and the magazine having upper and lower portions and a hinge connecting the portions together at the rear end with the upper portion being swingable about the hinge between a closed position in engagement with the lower portion to enclose a package within the magazine and an open position wherein a package can be loaded into the magazine, the improvement comprising:

drive means adjacent the rear end of the magazine engageable with a package in the magazine for removing the bag from the stack of sheets therein, the upper portion of the magazine having an elongate opening between the drive means and the rear end of the magazine through which the bag can be driven by the drive means, and means for deflecting the bag toward the front end of the magazine as it is driven through the opening.

2. A magazine as set forth in claim 1 wherein the drive means comprises a pair of gears rotatable about axes that are parallel to each other, the axes being substantially parallel to a plane from the front end to the rear end of the magazine.

3. A magazine as set forth in claim 1 wherein the drive means comprises a pair of gears rotatable about axes that are parallel to each other, the axes being located in a plane that is inclined at an angle to a plane from the front end to the rear end of the magazine.

4. A magazine as set forth in claim 1 wherein the drive means comprises a pair of gears rotatable about axes that are parallel to each other, and the magazine has means located adjacent a center portion of at least one of the gears to limit a tendency of the gears to flex when the gears are driven.

* * * * *